United States Patent
Chiang

[19]

[11] Patent Number: 5,836,237
[45] Date of Patent: Nov. 17, 1998

[54] APPARATUS FOR BAKING BREAD AND MAKING ICE CREAM

[76] Inventor: Hanh Chiang, No. 162, Chung-Chen S. Rd., Hsia-Jen Hsiang, Tainan Hsien, Taiwan

[21] Appl. No.: 5,783

[22] Filed: Jan. 12, 1998

[51] Int. Cl.[6] .............................. A21B 1/00; A21D 8/00; A23G 9/00; A47J 27/00
[52] U.S. Cl. .............................. 99/348; 62/342; 99/340; 99/357; 99/455; 99/484; 366/144; 366/146; 366/314; 366/601
[58] Field of Search .............................. 99/325–332, 340, 99/348, 357, 352–355, 452–455, 466, 468, 484, 470; 62/342, 343, 136; 366/98, 144, 146, 149, 314, 601; 318/282

[56] References Cited

U.S. PATENT DOCUMENTS

| | | | |
|---|---|---|---|
| 4,070,957 | 1/1978 | Korekawa et al. | 99/455 |
| 4,583,863 | 4/1986 | Pandolfi | 366/149 |
| 4,632,566 | 12/1986 | Masel et al. | 62/343 X |
| 4,643,583 | 2/1987 | Cecchini | 366/149 |
| 4,664,529 | 5/1987 | Cavalli | 366/144 X |
| 4,708,489 | 11/1987 | Carlson | 366/149 |
| 4,716,822 | 1/1988 | O'Brien | 99/455 |
| 4,974,965 | 12/1990 | Heinhold et al. | 99/455 X |
| 5,076,153 | 12/1991 | Takahashi et al. | 99/327 |
| 5,351,606 | 10/1994 | Matsuzaki | 99/348 |
| 5,363,746 | 11/1994 | Gordon | 99/328 |
| 5,433,139 | 7/1995 | Kitagawa et al. | 99/327 |
| 5,549,042 | 8/1996 | Bukoschek et al. | 62/342 X |

*Primary Examiner*—Timothy F. Simone
*Attorney, Agent, or Firm*—Townsend and Townsend and Crew LLP

[57] ABSTRACT

An apparatus for baking bread and making ice cram includes a housing unit, a bread baking assembly, an ice-cream making assembly and a base assembly. A selected one of the bread baking assembly and the ice-cream making assembly can be mounted into the housing unit and can be activated by a motor-driven member of the base assembly.

12 Claims, 11 Drawing Sheets

APPARATUS FOR BAKING BREAD AND MAKING ICE CREAM

BACKGROUND OF THE INVENTION

1. Field of the Invention

This invention relates to an apparatus for baking bread and making ice cream in which a selected one of a bread baking assembly and an ice-cream making assembly can be mounted into a housing unit for baking bread or making ice cream.

2. Description of the Related Art

Normally, a conventional bread baking apparatus and a conventional ice-cream making apparatus incorporate a bulky housing unit. These two apparatuses occupy too much space. Furthermore, it is difficult to carry the two apparatuses simultaneously.

SUMMARY OF THE INVENTION

The object of this invention is to provide an apparatus for baking bread and making ice cream in which a selected one of a bread baking assembly and an ice-cream making assembly can be mounted into a housing unit for baking bread or making ice cream.

According to this invention, an apparatus for baking bread and making ice cram includes a housing unit, a bread baking assembly, an ice-cream making assembly and a base assembly. A selected one of the bread baking assembly and the ice-cream making assembly can be mounted into the housing unit and can be activated by a motor-driven member of the base assembly.

BRIEF DESCRIPTION OF THE DRAWINGS

Other features and advantages of this invention will become apparent in the following detailed description of the preferred embodiment of this invention with reference to the accompanying drawings in which.

DETAILED DESCRIPTION OF THE PREFERRED EMBODIMENT

Figure 1:
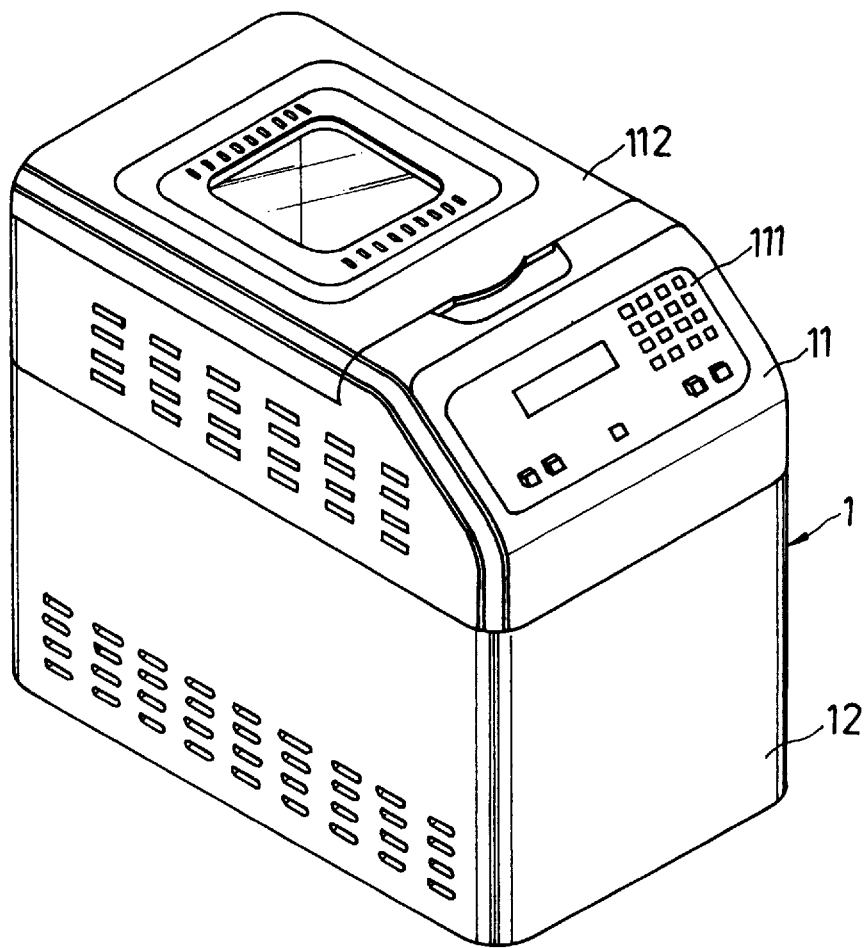
FIG. 1 is a perspective view of a housing unit of a preferred embodiment of an apparatus for baking bread and making ice cream according to this invention.
Figure 2:
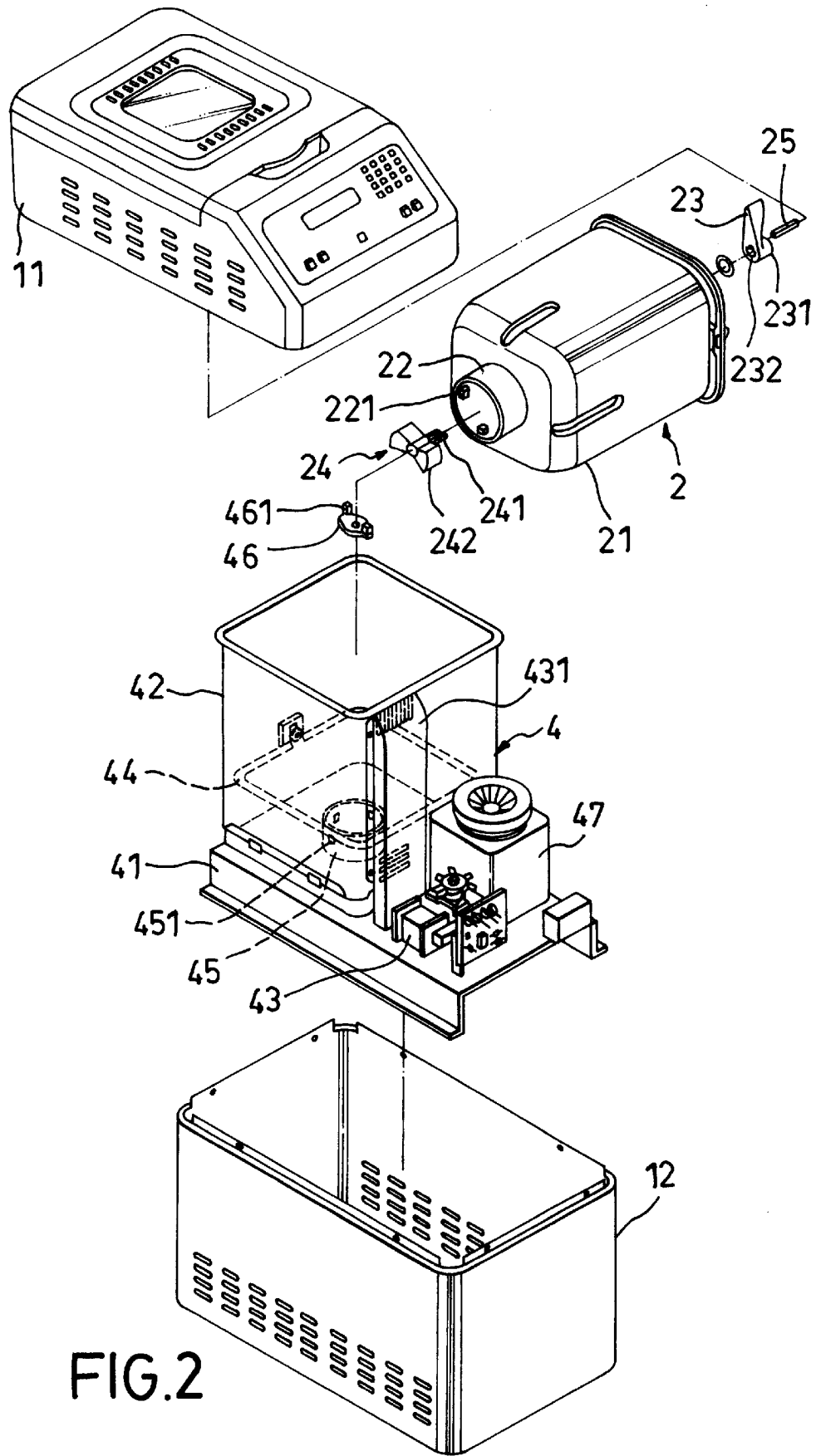
FIG. 2 is a partly exploded perspective view showing the housing unit, a base assembly and a bread baking assembly of the preferred embodiment.
Figure 8:
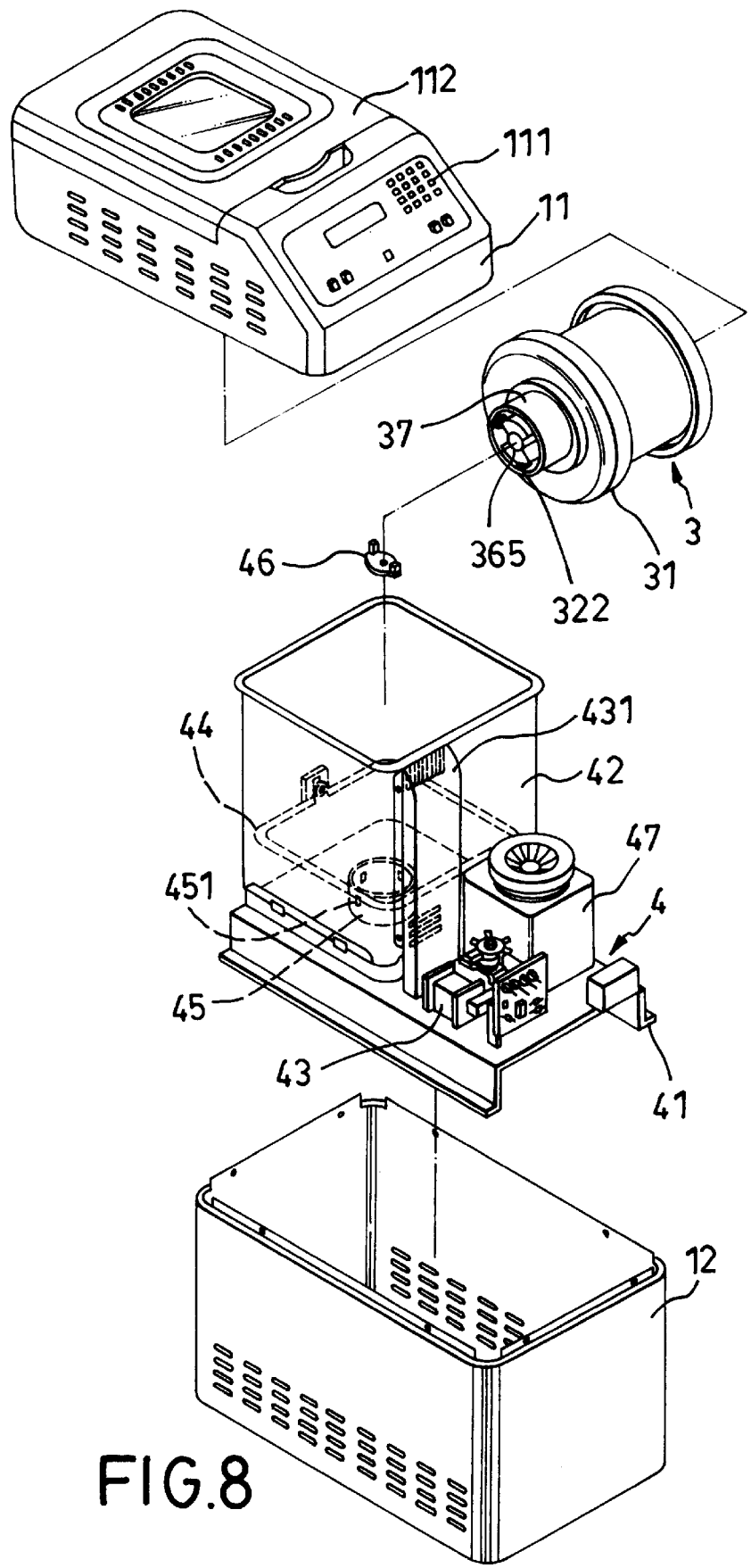
FIG. 8 is a partly exploded perspective view showing the housing unit, the base assembly and an ice-cream making assembly of the preferred embodiment, with a locking member of the ice-cream making assembly being omitted for the sake of clarity.

Referring to FIGS. 1, 2 and 8, the preferred embodiment of an apparatus for baking bread and making ice cream according to this invention is shown to include a housing unit 1 (see FIG. 1), a bread baking assembly 2 (see FIG. 2), an ice-cream making assembly 3 (see FIG. 8) and a base assembly 4 (see FIGS. 2 and 8).

Referring to FIG. 1, the housing unit 1 includes a rectangular upper housing 11 and a rectangular lower housing 12 which is connected detachably to the upper housing 11. The upper housing 11 is provided with a switch panel 111 and a removable cover 112 which is mounted detachably on the upper housing 11 in a known manner for covering a generally rectangular upper end opening 113 (see FIG. 3) in the upper housing 11.

Figure 3:
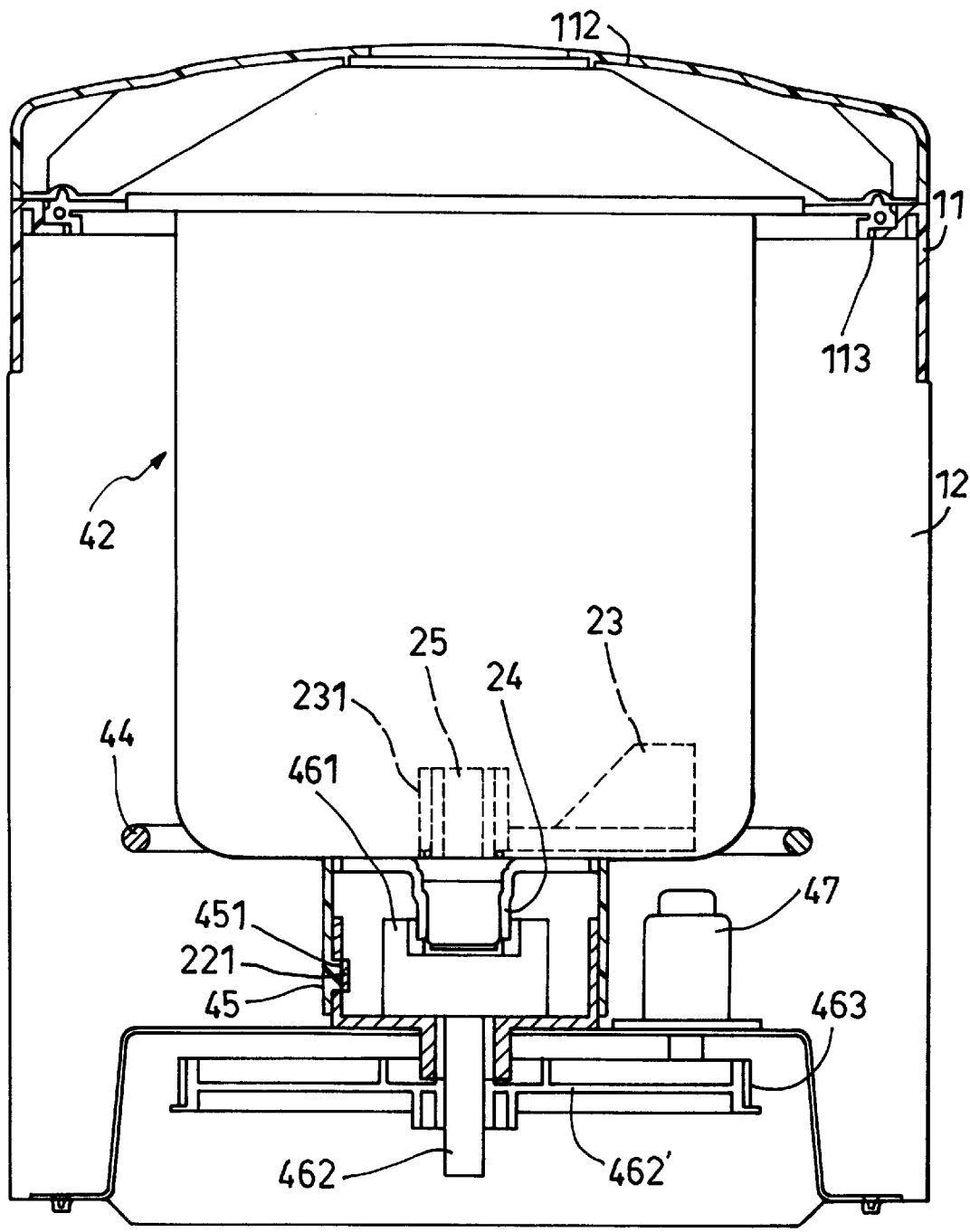
FIG. 3 illustrates how the preferred embodiment is used as a bread baking apparatus.
Figure 4:
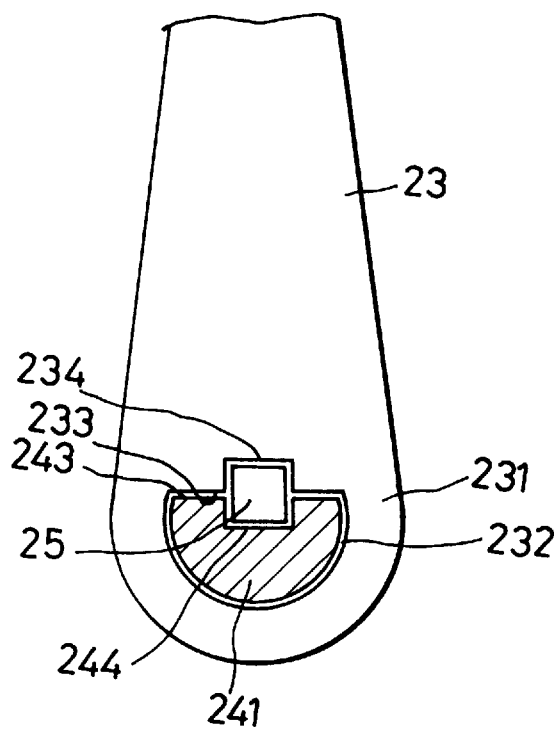
FIG. 4 illustrates the interconnection between a bread stirrer and a small driving member of the bread baking assembly of the preferred embodiment.

Referring to FIGS. 2, 3 and 4, the baking assembly 2 is mounted detachably into the housing unit 1 (see FIG. 1) and includes a vertical baking barrel 21, a vertical, hollow small outer cylinder 22 integrally formed with a bottom surface of The baking barrel 21, a bread stirrer 23 and a small driving member 24.

The small outer cylinder 22 is made of plastic and has an open lower end and an inner circumferential surface which is formed with a plurality of tongues 221. The bread stirrer 23 has a rotating shaft 231 with a bore 232 (see FIG. 4)that is generally semi-circular in cross-section. The rotating shaft 231 has a planar surface 233 in the bore 232, and a rectangular keyway 234 formed in the planar surface 233. The small driving member 24 is generally inverted T-shaped and consists of a vertical rod portion 241 and a horizontal rod portion 242 which are integrally formed with each other. The vertical rod portion 241 has a semi-circular cross-section and a planar surface 243 which is formed with a rectangular keyway 244 that is aligned with the keyway 234, and is engaged fittingly within the bore 232 in the bread stirrer 23 in such a manner that the planar surfaces 233, 243 overlap each other and that a key element 25 of semi-circular cross-section is engaged fittingly within the keyways 234, 244. In this way, the bread stirrer 23 can rotate synchronously with the small driving member 24.

The base assembly 4 includes a base 41 positioned within the lower housing 12, a barrel-receiving container 42 fixed on the base 41, an air blowing unit 43 disposed on the base 41 in a known manner for blowing air into the container 42 via an air pipe 431, an electrical heating member 44 disposed on a lower portion of the container 42, a vertical, hollow inner cylinder 45 fixed in the container 42, and a motor-driven member 46 mounted rotatably in the container 42 and driven by a motor 47 (see FIG. 3) which is installed on the base 41.

The inner cylinder 45 has an outer circumferential surface formed with a plurality of grooves 451 which engage respectively and fittingly the tongues 221 of the small outer cylinder 22, thereby locking the baking barrel 21 on the inner cylinder 45. Because the small outer cylinder 22 is made of plastic, the tongues 221 can be easily forced for removal from the grooves 451, thereby separating the bread baking assembly 2 from the base assembly 4.

Figure 5:
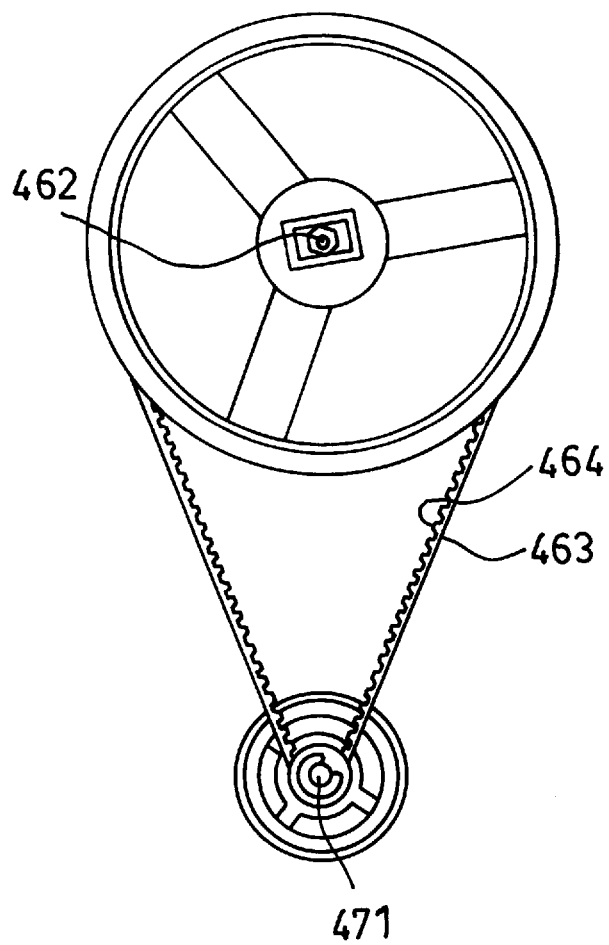
FIG. 5 illustrates how a motor-driven member is activated by a motor of the preferred embodiment.
Figure 6:
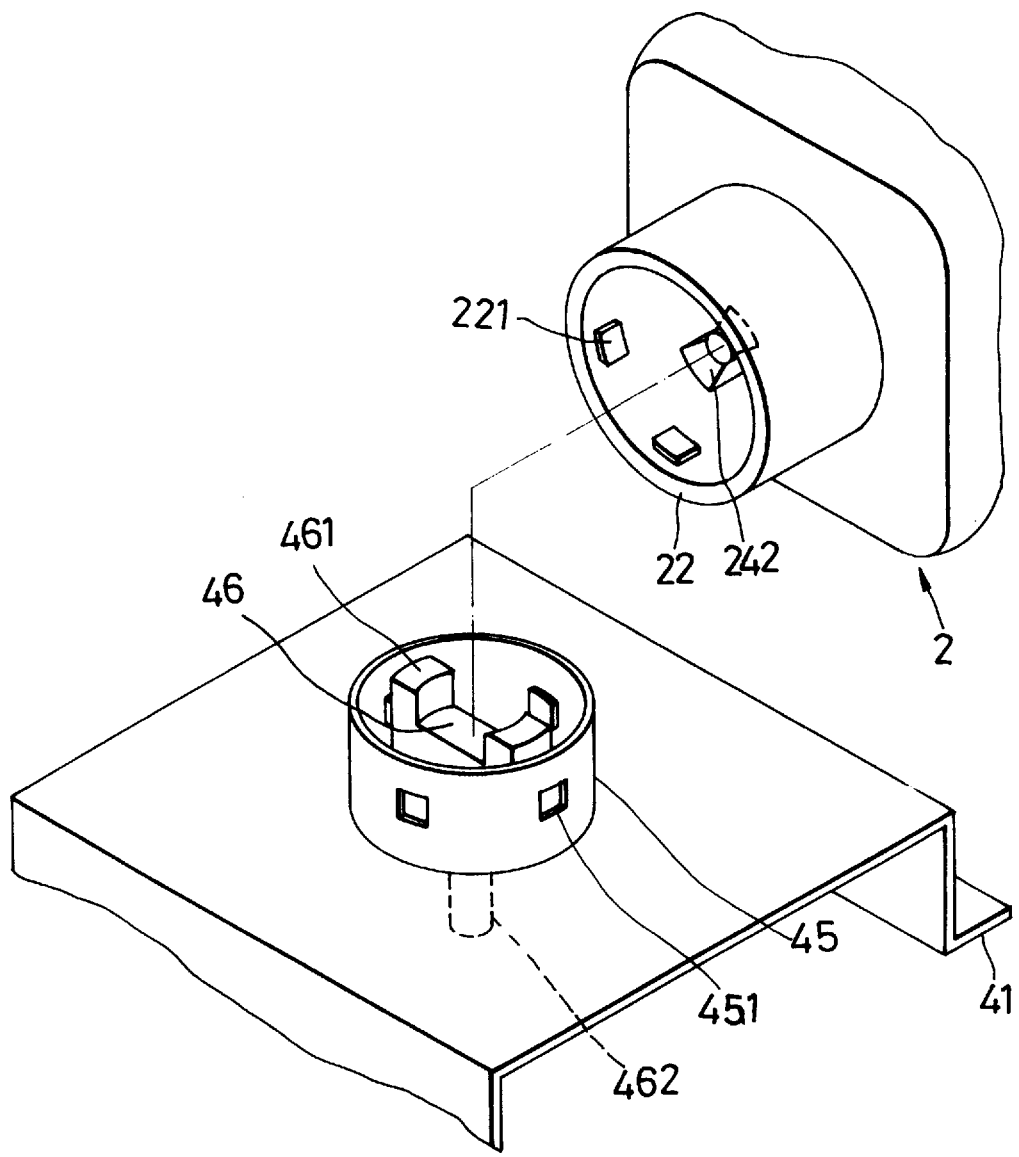
FIG. 6 is a partly exploded perspective view illustrating the coupling structure between the base assembly and the bread baking assembly of the preferred embodiment.
Figure 7:
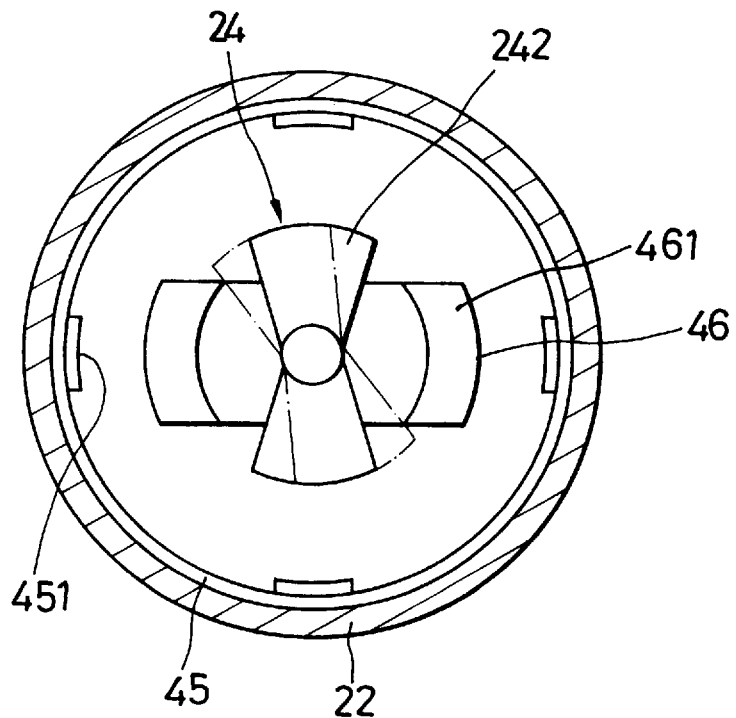
FIG. 7 illustrates the relative positions of a horizontal rod portion of the bread baking assembly and two pushing arms of the base assembly of the preferred embodiment.

The motor-driven member 46 is generally U-shaped and has a push arm unit consisting of two diametrically opposed vertical pushing arms 461 (see FIGS. 6 and 7) between which the horizontal rod portion 242 (see FIGS. 6 and 7) of the small driving member 24 is located, and a fixed rotating shaft 462 which is journalled on the base 41 and which is provided with a fixed gear 462'. As shown in FIGS. 2, 3 and 5, the rotation of the motor 47 can be transferred to the motor-driven member 46 by means of a V belt 463 which has inner teeth 464 on the inner surface thereof and which engages the gear 462' and a motor shaft 471 of the motor 47. When the motor-driven member 46 rotates, the pushing arms 461 push and rotate the small driving member 24 and the bread stirrer 23. At this time, the air blowing unit 43 and the electrical heating element 44 can be energized to perform a baking action in the container 42.

Figure 9:
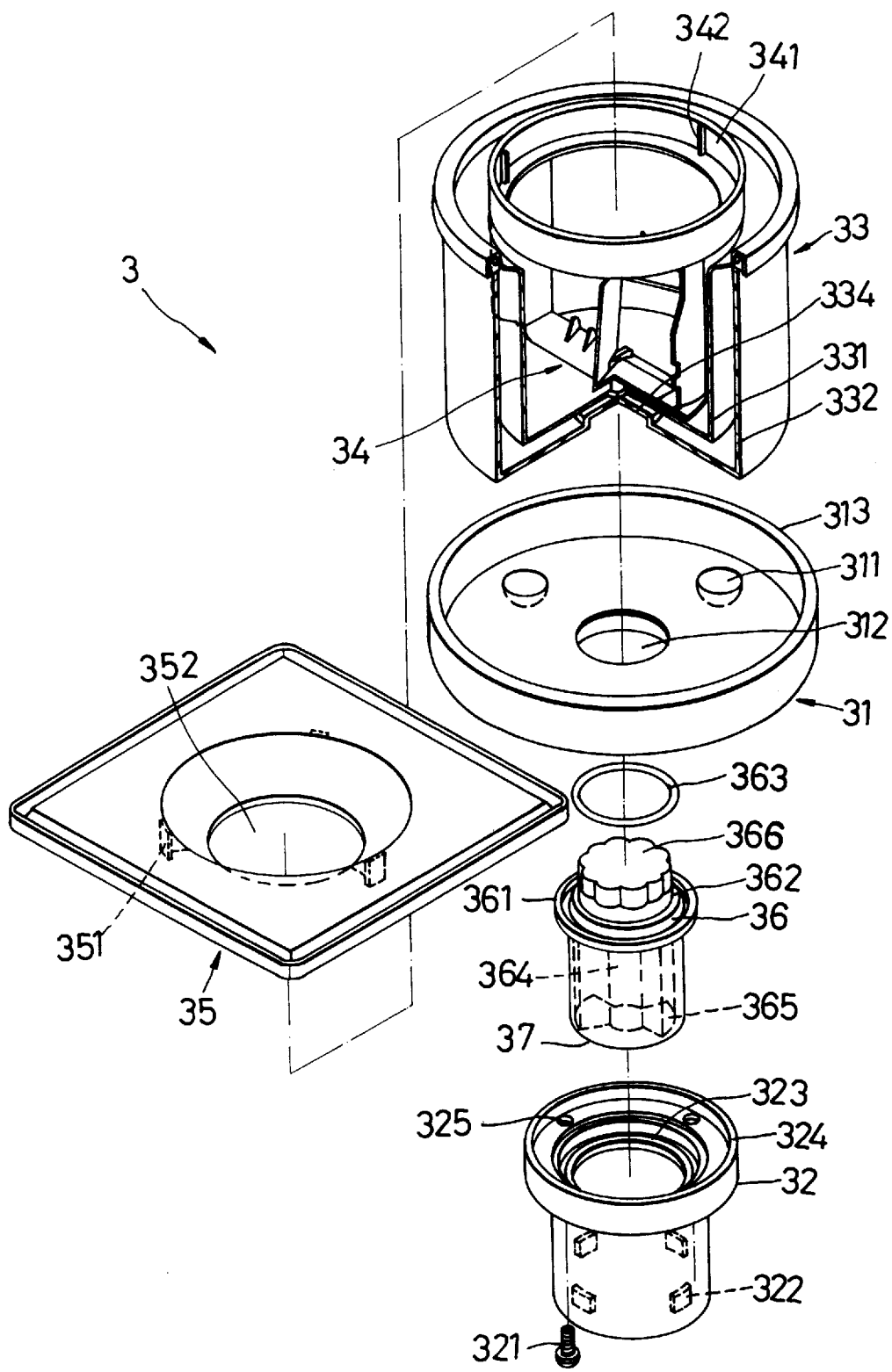
FIG. 9 is an partly exploded perspective view showing the ice-cream making assembly of the preferred embodiment.
Figure 10:
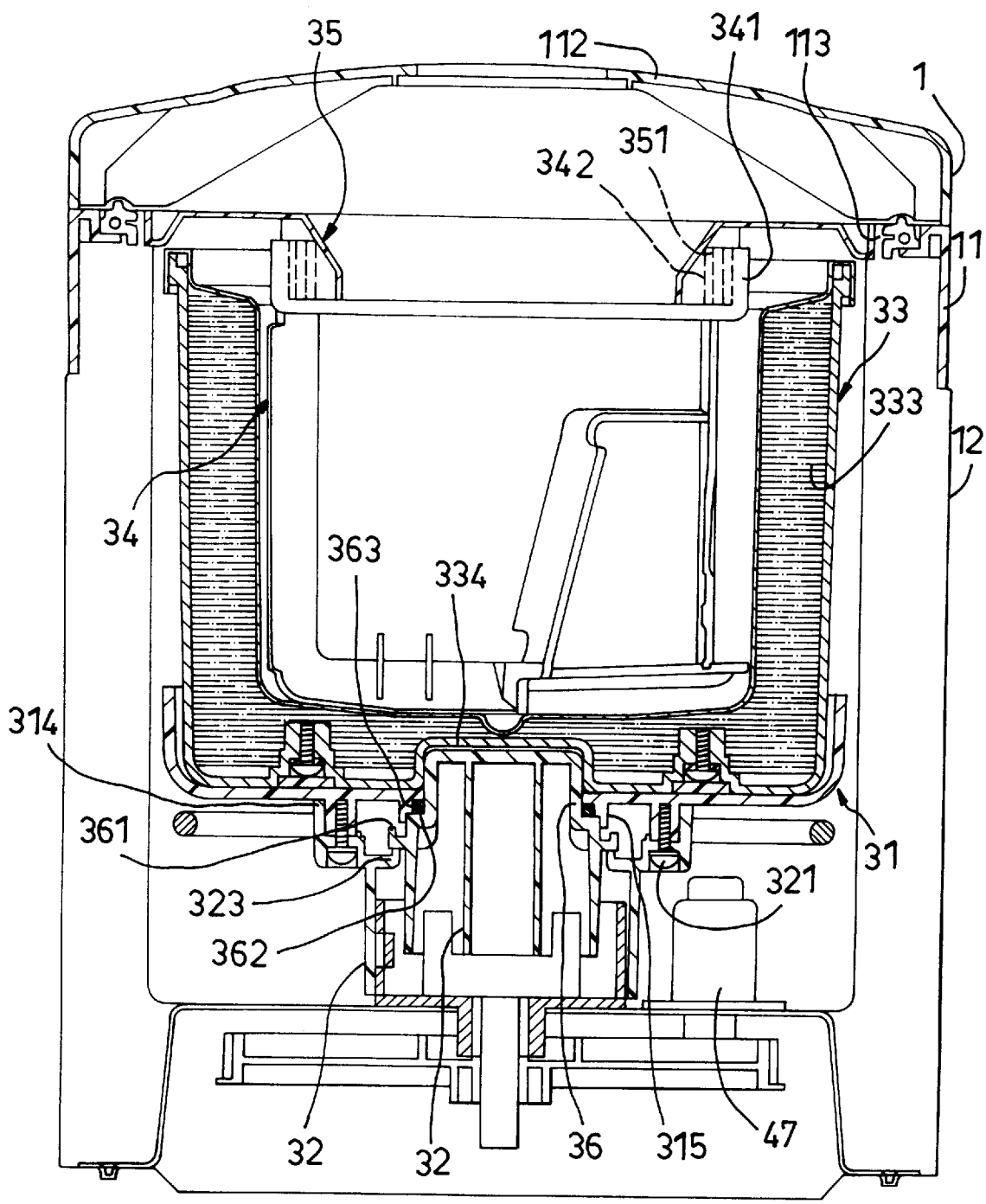
FIG. 10 illustrates how the preferred embodiment is used as an ice-cream making apparatus.

Referring to FIGS. 8, 9 and 10, the ice-cream making assembly 3 is mounted detachably into the housing unit 1 and includes a horizontal supporting disk 31, a vertical, hollow large outer cylinder 32 secured to a bottom surface of the supporting disk 31 by four bolts 321 (only one is shown in FIG. 9), a freezing barrel 33 mounted rotatably on the supporting disk 31, an ice-cream stirrer 34 mounted rotatably on the freezing barrel 32, a locking member 35 and a large driving member 36.

The supporting disk 31 has three peripheral holes 311 (only two are shown in FIG. 9) into which three fingers of the user can be respectively inserted for handling the supporting disk 31, a central hole 312 through which the large driving member 36 extends, and an upwardly extending flange 313 formed along the periphery of the supporting disk 31, thereby confining the freezing barrel 33 inside the flange 313.

The large outer cylinder 32 has an open lower end, an outer circumferential surface which is formed with a plurality of tongues 322, an inwardly extending flange 323 which supports an outwardly extending flange 361 of the large driving member 36, an annular upwardly extending flange 324 surrounding four internally threaded posts 314 (see FIG. 10) which project integrally and downwardly from a bottom surface of the supporting disk 31, and four holes 325 (only two are shown in FIG. 9). Each of the bolts 321 extends through the respective hole 325 to engage threadably the threaded hole in the respective post 314.

The freezing barrel 33 has a hollow surrounding wall body which includes a cylindrical inner wall 331, a cylindrical outer wall 332 and a refrigerant 333 contained in the wall body between the inner and outer walls 331, 332.

The ice-cream stirrer 34 is placed into the freezing barrel 33 and has a fixed upper end ring 341 and a plurality of radially extending ribs 342 which project integrally and inwardly from the upper end ring 341.

Figure 11:
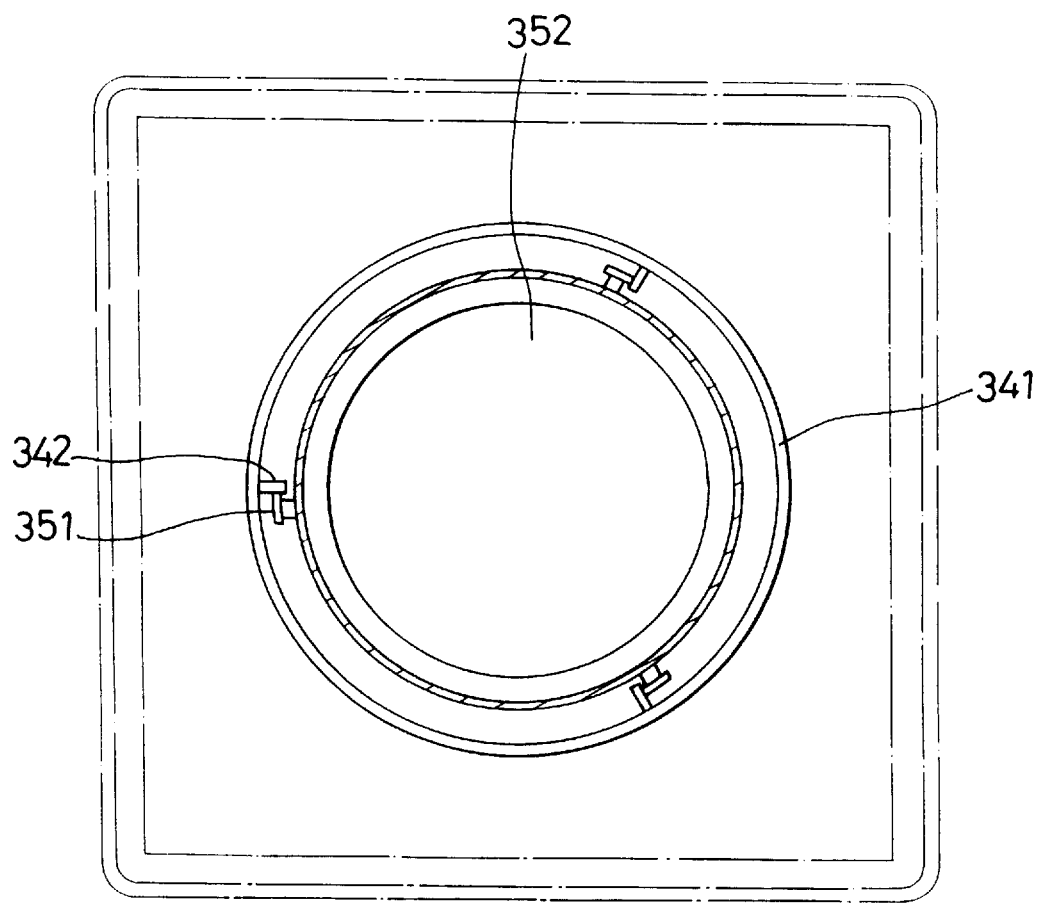
FIG. 11 illustrates how a freezing barrel is locked in a container of the preferred embodiment by a locking member.

The locking member 35 is rectangular and is received fittingly within the generally rectangular upper end opening 113 in the upper housing 11, thereby preventing rotation of the locking member 35 within the upper housing 11. Three generally circumferentially extending pushing plates 351 project integrally and downwardly from the locking member 35 and can rotate with the barrel 33 to the positions shown in FIG. 11 in which the plates 351 press against the ribs 342. Then, the pushing plates 351 cannot continue to rotate with the freezing barrel 33 in the same direction. The locking member 35 further has a central opening 352 through which a material for forming ice cream can be placed into the freezing barrel 33.

The large driving member 36 has a shoulder 362 and an O-ring 363 which is sleeved on the large driving member 36 between the shoulder 362 and an annular flange 315 (see FIG. 10) which projects integrally and downwardly from a bottom surface of the supporting disk 31. A vertical, hollow cylinder 37 is integrally formed with the large driving member 36 and is located in the large outer cylinder 32. The large driving member 36 further includes a generally inverted T-shaped integral portion consisting of a vertical rod portion 364 and a horizontal rod portion 365, and an integral engagement portion 366 which has a non-circular shape and which complements to a recess 334 in a bottom surface of the freezing barrel 33 for engagement therewith, thereby rotating the freezing barrel 33 synchronously with the large driving member 36.

The large outer cylinder 32 is fixed on the base assembly 4 in a manner similar to that of the small outer cylinder 22 (see FIG. 2). The large driving member 36 is driven by the motor 47 in a manner similar to that of the small driving member 24 so as to rotate the freezing barrel 33 on the supporting disk 31, thereby performing relative rotation between the ice-cream stirrer 34 and the freezing barrel 34.

Accordingly, a selected one of the bread baking assembly 2 and the ice-cream making assembly 3 can be mounted removably into the housing unit 1 via the upper end opening 113 in the upper housing 11 upon the removal of the cover 112 to form a bread baking apparatus or an ice-cream making apparatus.

With this invention thus explained, it is apparent that numerous modifications and variations can be made without departing from the spirit and scope of this invention. It is therefore intended that this invention be limited only as indicated in the appended claims.

I claim:

1. An apparatus for baking bread and making ice cream, comprising:

a housing unit including a lower housing and an upper housing which is mounted detachably on said lower housing, said upper housing being formed with an upper opening and being provided with a removable cover for covering said upper opening;

a bread baking assembly mounted detachably into said housing unit and including:
  a vertical baking barrel having a bottom surface,
  a vertical, hollow small outer cylinder fixed to said bottom surface of said baking barrel, said small outer cylinder being made of plastic and having an open lower end and an inner circumferential surface which is formed with a plurality of tongues,
  a bread stirrer having a fixed rotating shaft which is mounted rotatably in said baking barrel, and
  a small driving member having a fixed horizontal rod portion and coupled with said rotating shaft of said bread stirrer in such a manner that said rotating shaft of said bread stirrer can rotate synchronously with said small driving member;

an ice-cream making assembly mounted detachably into said housing unit and including:
  a horizontal supporting disk having a bottom surface;
  a vertical, hollow large outer cylinder fixed to said bottom surface of said supporting disk, said large outer cylinder being made of plastic and having an open lower end and an inner circumferential surface which is formed with a plurality of tongues,
  a freezing barrel mounted rotatably on said supporting disk and having a hollow surrounding wall body which includes a cylindrical inner wall, a cylindrical outer wall surrounding said inner wall, and a refrigerant contained in said wall body between said inner and outer walls,
  an ice-cream stirrer mounted rotatably in said freezing barrel, a locking member locking said ice-cream stirrer relative to said housing unit when said ice-cream making assembly is mounted in position with respect to said housing unit, and a large driving member having a fixed horizontal rod portion and coupled with said freezing barrel in such a manner that said freezing barrel can rotate synchronously with said large driving member; and a base assembly including:

a base positioned within said lower housing, a barrel-receiving container fixed on said base, an air blowing unit disposed on said base to blow air into said container, a motor installed on said base, an electrical heating member disposed on a lower portion of said container, a vertical, hollow inner cylinder fixed in said container and having an outer circumferential surface formed with a plurality of grooves which can engage respectively and fittingly said tongues of said bread baking assembly when said bread baking assembly is placed into said housing unit via said upper end opening of said upper housing upon removal of said cover from said upper end opening and which can engage respectively and fittingly said tongues of said ice-cream making assembly when said ice-cream making assembly is placed into said housing unit via said upper end opening upon removal of said cover from said upper end opening, and a motor-driven member mounted rotatably in said container and having a fixed vertical push arm unit, said motor being capable of being energized to rotate said push arm unit of said motor-driven member about a vertical axis so as to contact and rotate synchronously said horizontal rod portion of said small driving member with said push arm unit when said tongues of said bread baking assembly are engaged within said grooves of said base assembly, thereby rotating said bread stirrer in said baking barrel, and so as to contact and rotate synchronously said horizontal rod portion of said large driving member with said push arm unit when said tongues of said ice-cream making assembly are engaged within said grooves of said base assembly, thereby rotating said freezing barrel in said housing unit.

2. An apparatus as claimed in claim 1, wherein said motor-driven member is generally U-shaped and includes two diametrically opposed vertical pushing arms which constitute said push arm unit, each of said small and large driving members having a generally inverted T-shaped integral portion so as to locate said horizontal rod portion of said small driving member between said pushing arms when said bread baking assembly is mounted into said housing unit, and so as to locate said horizontal rod portion of said large driving member between said pushing arms when said ice-cream making assembly is mounted into said housing unit.

3. An apparatus as claimed in claim 1, wherein said rotating shaft of said bread stirrer has a bore that is generally semi-circular in cross-section, and a planar surface located in said bore, said small driving member including a fixed vertical rod portion which has a semi-circular cross-section and a planar surface, and which engages fittingly said bore of said bread stirrer, said planar surface of each of said rotating shaft and said vertical rod portion having an axially extending rectangular keyway, said planar surfaces of said rotating shaft and said vertical rod portion overlapping each other upon rotation of said small driving member, said bread baking assembly further including a key element of a rectangular cross-section which is engaged fittingly within said keyways in said rotating shaft and said vertical rod portion, thereby permitting synchronous rotation of said bread stirrer with said small driving member.

4. An apparatus as claimed in claim 1, wherein said large driving member includes an integral engagement portion, said freezing barrel having a bottom surface formed with a recess which has a non-circular shape complementary to said engagement portion of said large driving member so as to engage fittingly said engagement portion of said large driving member within said recess of said freezing barrel, thereby permitting synchronous rotation of said freezing barrel with said large driving member.

5. An apparatus as claimed in claim 1, wherein said ice-cream stirrer includes a fixed upper end ring and a plurality of radially extending ribs which project integrally and inwardly from said upper end ring and which are angularly equidistant, said upper end opening of said upper housing being generally rectangular, said locking member being rectangular and being received fittingly within said upper end opening of said upper housing, thereby fixing said locking member to said container, said locking member further including a plurality of generally circumferentially extending pushing plates which project integrally and downwardly therefrom and which can rotate with said freezing barrel to respectively press against said ribs of said ice-cream stirrer, thereby preventing continuous rotation of said ice-cream stirrer with said freezing barrel in said container.

6. A bread baking apparatus comprising:

a housing unit including a lower housing and an upper housing which is mounted detachably on said lower housing, said upper housing being formed with an upper opening and being provided with a removable cover for covering said upper opening;

a vertical baking barrel having a bottom surface;

a vertical, hollow small outer cylinder fixed to said bottom surface of said baking barrel, said small outer cylinder being made of plastic and having an open lower end and an inner circumferential surface which is formed with a plurality of tongues;

a bread stirrer having a fixed rotating shaft which is mounted rotatably in said baking barrel;

a small driving member having a fixed horizontal rod portion and coupled with said rotating shaft of said bread stirrer in such a manner that said rotating shaft of said bread stirrer can rotate synchronously with said small driving member; and a base assembly including:

a base positioned within said lower housing, a barrel-receiving container fixed on said base, an air blowing unit disposed on said base to blow air into said container, a motor installed on said base, an electrical heating member disposed on a lower portion of said container, a vertical, hollow inner cylinder fixed in said container and having an outer circumferential surface formed with a plurality of grooves which can engage respectively and fittingly said tongues of said bread baking assembly when said bread baking assembly is placed into said housing unit via said upper opening of said upper housing upon removal of said cover from said upper opening, and a motor-driven member mounted rotatably in said container and having a fixed vertical push arm unit, said motor being capable of being energized to rotate said push arm unit of said motor-driven member about a vertical axis so as to contact and rotate synchronously said horizontal rod portion of said small driving member with said push arm unit when said tongues of said bread baking assembly are engaged within said grooves of said base assembly, thereby rotating said bread stirrer in said baking barrel.

7. An apparatus as claimed in claim 6, wherein said motor-driven member is generally U-shaped and includes two diametrically opposed vertical pushing arms which constitute said push arm unit, said small driving member being generally inverted T-shaped so as to locate said horizontal rod portion of said small driving member between said pushing arms when said bread baking assembly is mounted into said housing unit.

8. An apparatus as claimed in claim 6, wherein said rotating shaft of said bread stirrer has a bore that is generally semi-circular in cross-section, and a planar surface located in said bore, said small driving member including a fixed vertical rod portion which has a semi-circular cross-section and a planar surface, and which engages fittingly said bore of said bread stirrer, said planar surface of each of said rotating shaft and said vertical rod portion having an axially extending rectangular keyway, said planar surfaces of said rotating shaft and said vertical rod portion overlapping each other upon rotation of said small driving member, said bread baking assembly further including a key element of a rectangular cross-section which is engaged fittingly within said keyways in said rotating shaft and said vertical rod portion, thereby permitting synchronous rotation of said bread stirrer with said small driving member.

9. An ice-cream making apparatus comprising:
   a housing unit including a lower housing and an upper housing which is mounted detachably on said lower housing, said upper housing being formed with an upper opening and being provided with a removable cover for covering said upper opening;
   a horizontal supporting disk having a bottom surface;
   a vertical, hollow large outer cylinder fixed to said bottom surface of said supporting disk, said large outer cylinder being made of plastic and having an open lower end and an inner circumferential surface which is formed with a plurality of tongues;
   a freezing barrel mounted rotatably on said supporting disk and having a hollow surrounding wall body which includes a cylindrical inner wall, a cylindrical outer wall surrounding said inner wall, and a refrigerant contained in said wall body between said inner and outer walls;
   an ice-cream stirrer mounted rotatably in said freezing barrel;
   a locking member locking said ice-cream stirrer relative to said housing unit when said ice-cream making assembly is mounted in position with respect to said housing unit; and
   a large driving member having a fixed horizontal rod portion and coupled with said freezing barrel in such a manner that said freezing barrel can rotate synchronously with said large driving member; and
   a base assembly including:
      a base positioned within said lower housing,
      a barrel-receiving container fixed on said base,
      a motor installed on said base,
      a vertical, hollow inner cylinder fixed in said container and having an outer circumferential surface formed with a plurality of grooves which can engage respectively and fittingly said tongues of said ice-cream making assembly when said ice-cream making assembly is placed into said housing unit via said upper opening of said upper housing upon removal of said cover from said upper opening, and
      a motor-driven member mounted rotatably in said container and having a fixed vertical push arm unit, said motor being capable of being energized to rotate said push arm unit of said motor-driven member about a vertical axis so as to contact and rotate synchronously said horizontal rod portion of said large driving member with said push arm unit when said tongues of said ice-cream making assembly are engaged within said grooves of said base assembly, thereby rotating said freezing barrel in said housing unit.

10. An apparatus as claimed in claim 9, wherein said motor-driven member is generally U-shaped and includes two diametrically opposed vertical pushing arms which constitute said push arm unit, said large driving member having a generally inverted T-shaped integral portion so as to locate said horizontal rod portion of said large driving member between said pushing arms when said ice-cream making assembly is mounted into said housing unit.

11. An apparatus as claimed in claim 9, wherein said large driving member includes an integral engagement portion, said freezing barrel having a bottom surface formed with a recess which has a non-circular shape complementary to said engagement portion of said large driving member so as to engage fittingly said engagement portion of said large driving member within said recess of said freezing barrel, thereby permitting synchronous rotation of said freezing barrel with said large driving member.

12. An apparatus as claimed in claim 9, wherein said ice-cream stirrer includes a fixed upper end ring and a plurality of radially extending ribs which project integrally and inwardly from said upper end ring and which are angularly equidistant, said upper end opening of said upper housing being generally rectangular, said locking member being rectangular and being received fittingly within said upper end opening of said upper housing, thereby fixing said locking member to said container, said locking member further including a plurality of generally circumferentially extending pushing plates which project integrally and downwardly therefrom and which can rotate with said freezing barrel to respectively press against said ribs of said ice-cream stirrer, thereby preventing continuous rotation of said ice-cream stirrer with said freezing barrel in said container.

\* \* \* \* \*